United States Patent [19]

Ashbrook

[11] 4,050,531
[45] Sept. 27, 1977

[54] BEAM BALANCE WEIGHING SCALE WITH SELF-ALIGNING POINT CONTACT SUPPORT ELEMENTS

[76] Inventor: Clifford Logan Ashbrook, 7500 Callaghan Road, San Antonio, Tex. 78229

[21] Appl. No.: 657,672

[22] Filed: Feb. 12, 1976

[51] Int. Cl.² .................. G01G 21/08; G01G 1/24
[52] U.S. Cl. ................... 177/198; 177/246; 177/DIG. 9; 308/2 R
[58] Field of Search ........... 177/DIG. 9, 190, 198, 177/264; 308/2 R

[56] References Cited

U.S. PATENT DOCUMENTS

| 334,051 | 1/1886 | Redline | 177/252 |
|---|---|---|---|
| 2,097,025 | 10/1937 | Flanagan | 177/198 X |
| 2,914,361 | 11/1959 | Turner | 308/2 R |
| 3,133,609 | 5/1964 | Lau | 177/118 |
| 3,174,568 | 3/1965 | Eisner | 177/247 |

Primary Examiner—Joseph W. Hartary
Attorney, Agent, or Firm—Townsend and Townsend

[57] ABSTRACT

A low-cost rugged beam balance weighing scale with an automatically aligning point contact support mechanism. The beam balance is supported centrally of a base and a pair of balance pans are each supported on opposite ends of the beam, with all supports employing a tapered male member terminating in a rounded point and a female member having a recess for receiving the rounded point of the male member. The radius of curvature of the central region of the recess is greater than the radius of curvature of the mating rounded point to ensure point contact support therebetween.

Automatic alignment is provided by providing a loose fit between a coupling portion of either the male or the female member and a corresponding mounting aperture in an appropriate support region of the base, beam or balance pan, the aperture being oval and oriented with the maximum inner dimension normal to the longitudinal axis of the beam balance. Several alternate equivalent arrangements are shown for the point contact support elements.

The scale is provided with a tare adjustment mechanism, a zero indicator and means for preventing the beam from being completely disengaged from the base.

23 Claims, 9 Drawing Figures

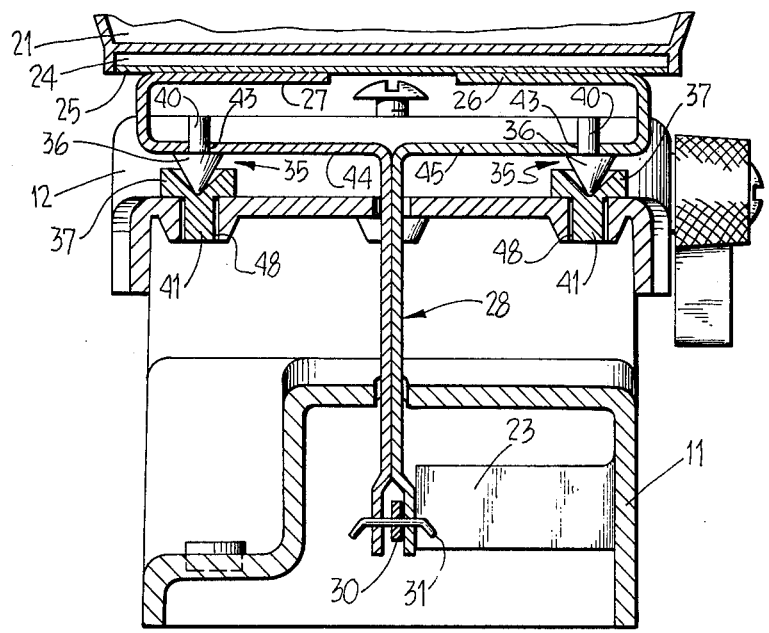
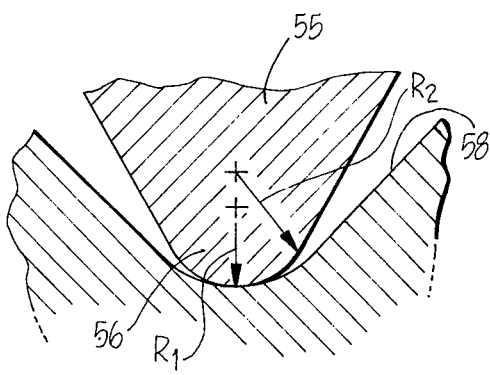
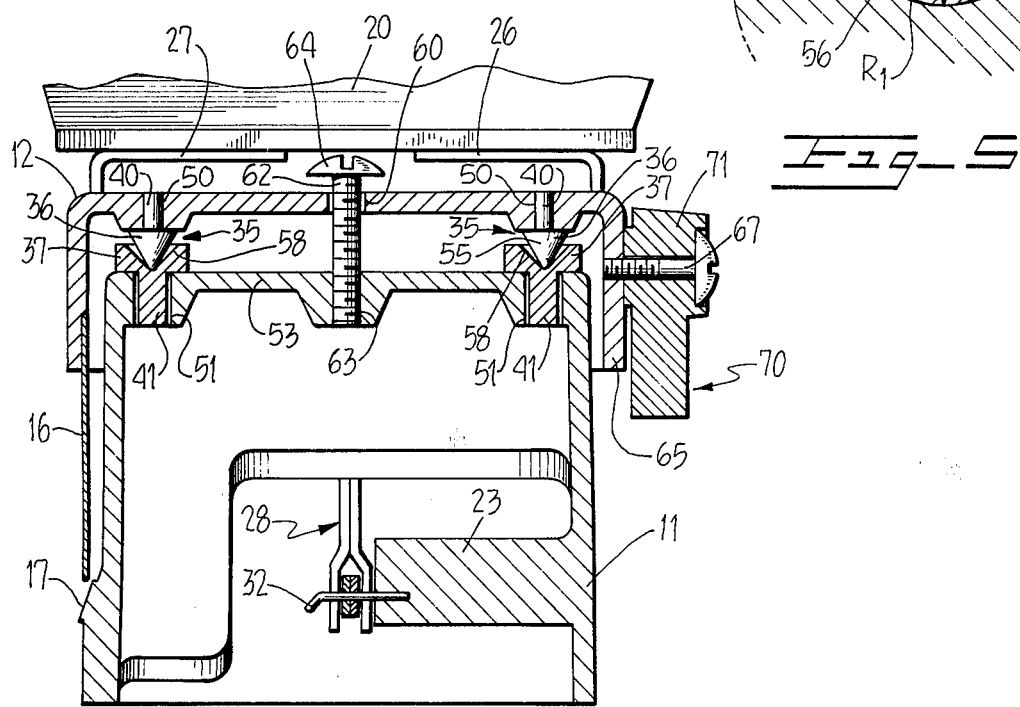
Fig. 3
Fig. 5
Fig. 4

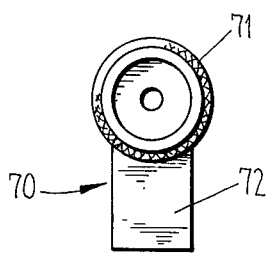
Fig_6
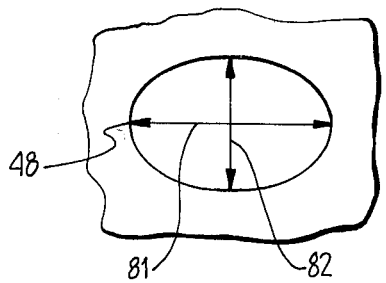
Fig_9
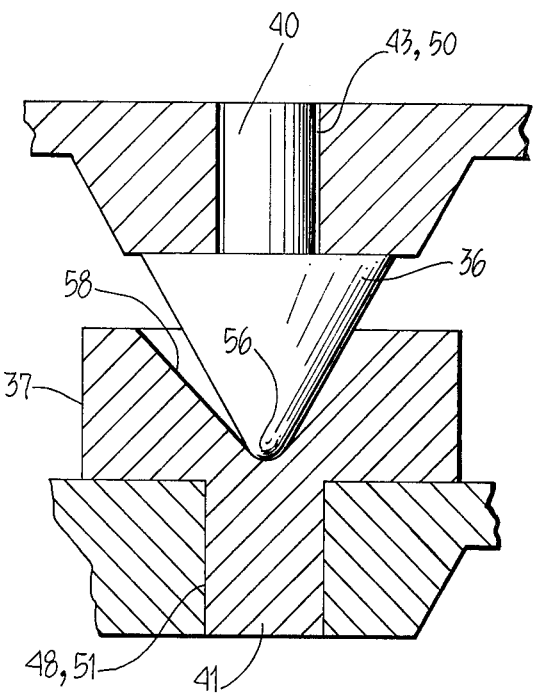
Fig_7
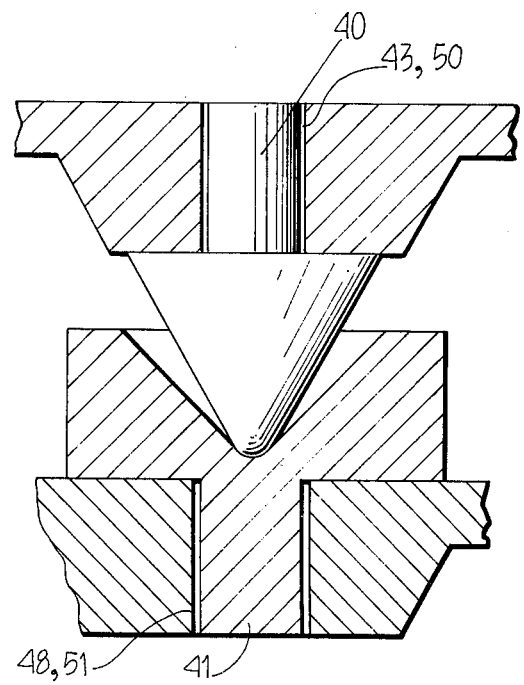
Fig_8

BEAM BALANCE WEIGHING SCALE WITH SELF-ALIGNING POINT CONTACT SUPPORT ELEMENTS

BACKGROUND OF THE INVENTION

This invention relates to balance beam weighing scales and is particularly adapted for use as a low-cost beam balance weighing scale for schoolroom use.

Beam balance weighing scales are well-known and typically include a base having a fulcrum transversely arranged along the longitudinal axis at the midpoint thereof, a beam balance supported on the fulcrum, and a pair of balance pans supported on the beam balance at opposite ends thereof. A pointer is typically attached to the beam and cooperates with a scale secured to the base to provide a visible zero balance indication. In use, an object of unknown weight is placed in one of the balance pans and test weights are added to the other balance pan until the beam pointer indicates a zero balance condition.

Although precision beam balance weighing scales of excellent design are well-known, their delicate nature and relatively high cost render them unsuitable for most schoolroom applications in which the persons operating the scales are students who are relatively unskilled in the operation of such devices. Although beam balance weighing scales have been designed for schoolroom use, such scales have been found deficient in one or more respects. Some are inexpensive to fabricate but are fragile or grossly inaccurate. Others are rugged and relatively accurate, but expensive. None combines the desiderata of simplicity, low cost and substantial accuracy.

SUMMARY OF THE INVENTION

The invention comprises a beam balance weighing scale which is rugged in construction, extremely low in manufacturing cost, is relatively accurate and which utilizes a novel self-aligning point contact support system.

More particularly, the invention comprises a beam balance weighing scale having a base, a beam balance, and a balance pan means all fabricated from relatively low-cost materials, with the beam balance supported by the base in a central fulcrum region, and the balance pan means supported by the beam in beam fulcrum regions outboard of the base fulcrum region at opposite sides thereof, by a common point contact support arrangement.

Each point contact support arrangement includes a male member having a longitudinally extending portion tapering inwardly toward one end thereof and terminating in a rounded point having a first radius of curvature, and a female support member having a centrally arranged recess for receiving the rounded point, the recess having a radius of curvature greater than the radius of curvature of the rounded point. The beam is supported on the base, and each balance pan is supported on the beam, by first and second pairs of such mating members, each pair being laterally spaced along the corresponding fulcrum region.

Self-alignment for each pair of mating members is provided by associating a coupling portion, preferably substantially cylindrical, of one of each pair of mating members with a mounting aperture in the base, beam or balance pan means in such a manner as to provide a loose fit therebetween. This loose fit may be between the coupling portion of the female member of a given pair and its associated mounting aperture, between a male member of a given pair and its associated mounting aperture, or between the coupling portions of both the male and the female members and their associated mounting apertures. Each mounting aperture preferably has an oval contour in the plane normal to the axis thereof with a maximum inner dimension arranged generally normal to the longitudinal axis of the beam balance and a minimum inner dimension arranged generally parallel to the longitudinal axis of the beam balance.

Tare adjustment is provided by a simple integral knob element fastened to the front or back sidewall of the beam on a rotatable axis passing through the transverse center line of the beam. This element has a central body portion which is substantially symmetrical about the axis and a projecting portion extending in a direction generally perpendicular to the axis and capable of providing a tare adjustment moment to the right or left of the beam center line when the element is rotated clockwise or counterclockwise.

The scale is further provided with means for preventing complete withdrawal of the beam balance from the base, which comprises a motion restricting member passed through an aperture formed in the top wall of the beam balance and secured to the top wall of the base, the motion restricting member including an enlarged head portion providing sufficient clearance for normal oscillatory motion of the beam but preventing removal of the beam entirely.

For a fuller understanding of the nature and advantages of the invention, reference should be had to the ensuing detailed description taken in conjunction with the accompanying drawings.

BRIEF DESCRIPTION OF THE DRAWINGS

FIG. 3 is a sectional view taken along lines 3—3 of FIG. 2;

FIG. 4 is a sectional view taken along lines 4—4 of FIG. 2;

FIG. 5 is an enlarged sectional view of the point contact support means;

FIG. 6 is an end elevational view of the tare adjustment means;

FIGS. 7 and 8 are enlarged partial sectional views showing alternate embodiments of the point contact support means.

FIG. 9 is an enlarged partial top plan view taken after lines 9—9 of FIG. 3 illustrating the preferred mounting aperture.

DESCRIPTION OF THE PREFERRED EMBODIMENTS

Figure 1:
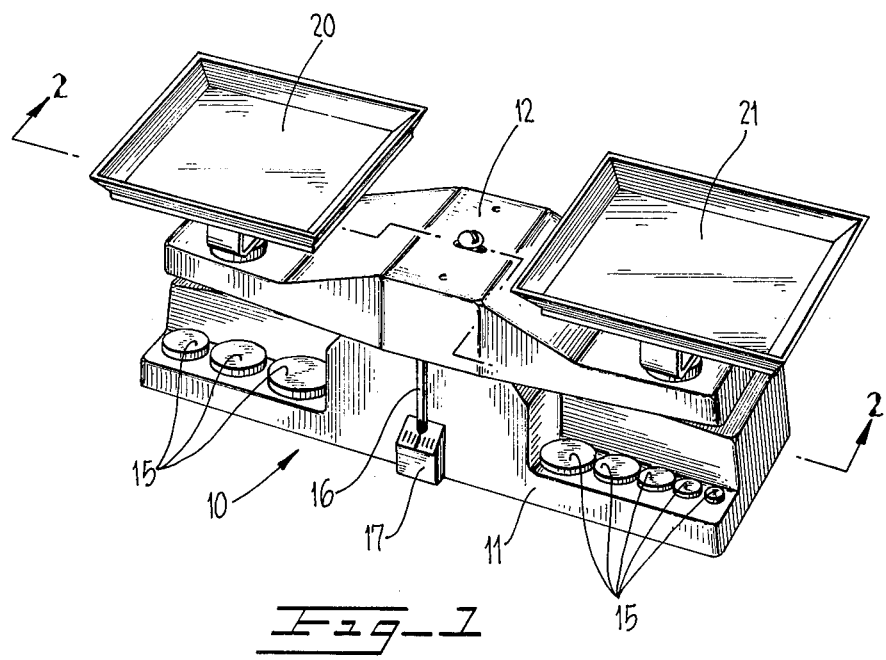
FIG. 1 is a perspective view of a preferred embodiment of the invention.
Figure 2:
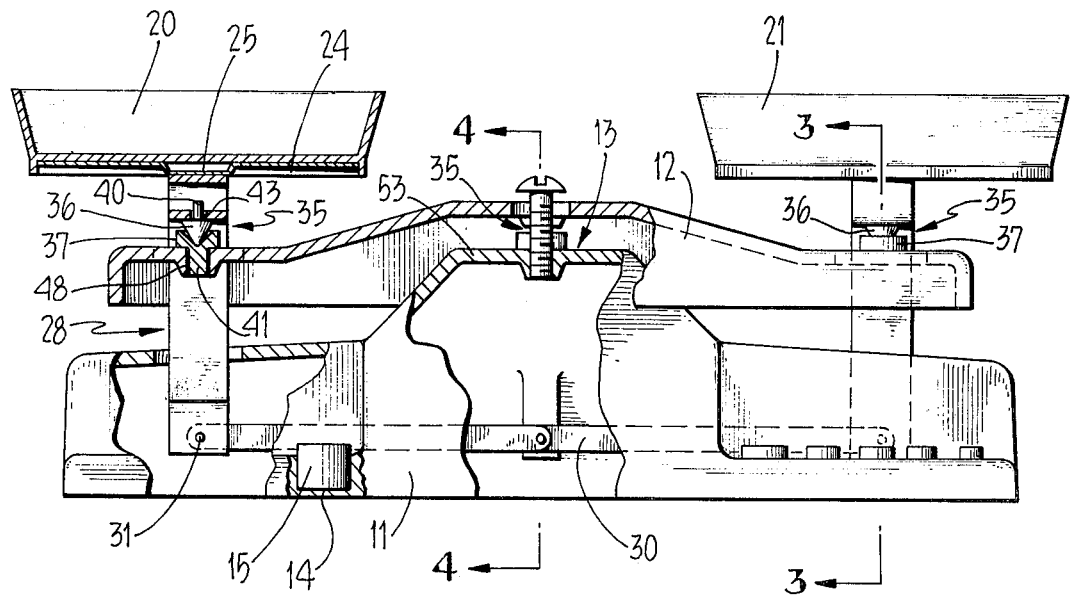
FIG. 2 is a partial sectional view taken along lines 2—2 of FIG. 11.

Turning now to the drawings, FIG. 1 shows a perspective view of a preferred embodiment of the invention. As seen in this Fig., a beam balance weighing scale generally designated by reference numeral 10 includes a hollow base 11 providing support for a beam balance 12 mounted thereon for oscillatory motion about a central fulcrum region generally designated by reference numeral 13 (FIG. 2). Base 11 is preferably formed with a plurality of recesses such as recess 14 shown in FIG. 2 for housing a plurality of test weights 15. A pointer 16 carried by beam balance 12 cooperates with a scale 17 on base 11 to provide a zero balance indication. Both base 11 and beam balance 12 are preferably each one-piece plastic molded pieces.

A pair of balance pans 20, 21 are pivotally supported by point contact support means described below on opposite ends of beam balance 12 on different outboard sides of the fulcrum region 13. As best shown in FIGS. 2–4, balance pans 20, 21 are each pivotally linked to a forwardly extending base projection 23 by means of a support plate 24 having a central downwardly extending channel 25 to which the upper portions 26, 27 of a yoke 28 are secured (e.g., by welding), a leveling arm 30 pivotally secured to the lower end of yoke 28 by means of a link pin 31 and pivotally secured to the free end of projection 23 by means of a pivot pin 32.

Beam balance 12 is supported in fulcrum region 13 of base 11, and balance pans 20, 21 are supported on beam balance 12 by a unique point support contact arrangement generally designated by reference numeral 35. Each point support contact arrangement 35 comprises a male member 36 and a female member 37. Each male member 36 and female member 37 is provided with a coupling portion in the form of a substantially cylindrical longitudinally extending stem 40, 41, respectively received in a corresponding mounting aperture. In the embodiment shown in FIGS. 2–4, each of the coupling portions 40 of male members 36 used to support the balance pans 20, 21 is received in a mounting aperture 43 formed in upper portions 44, 45 of yoke 28; while each of the coupling portions 41 of female members 37 are received in mounting apertures 48 formed in beam balance 12. Similarly, each of the coupling portions 40 of male members 36 used to mount balance beam 12 in fulcrum region 13 of base 11 are received in mounting apertures 50 in balance beam 12; while coupling portions 41 of female members 37 are received in mounting apertures 51 formed in upper central wall 53 of base 11.

Each male member 36 is provided with an inwardly tapering longitudinally extending portion 55, preferably conical, terminating in a rounded point 56 having a radius of curvature R1. Each female member 37 has a central recess 58 for receiving rounded point 56 and having a radius of curvature R2 which is greater than R1. Since R2 is greater than R1, each male member 36 is supported in point contact by its corresponding mating female member 37 over a range of solid angles determined by the apex angle of tapered portion 55 and the angle subtended by the surface of recess 58. In the preferred embodiment, tapered portions 55 of male members 36 are conical with an apex angle of 60° and each terminates in a spherical point having a radius of 0.01 inch; while each female member 37 has a conical recess with an apex angle of 90°, with the center of the recess having a spherically concave surface with a radius of 0.015 inch. Male and female members 36, 37 are preferably fabricated from a relatively hard material, e.g., sintered carbide or other sintered powdered metal materials with a hardness of grade 883 or the equal in order to provide ruggedness to the support points and thus long wear characteristics.

Beam balance 12 is provided with a thru aperture 60 through which the shank of a truss head machine screw 62 is passed. The lower threaded end of screw 62 is threaded into a threaded bore 63 in upper wall portion 53 of base 11. Screw 62 functions as a safety retainer which restricts the upward motion of beam balance 12 relative to base 11 so that male members 36 cannot be completely withdrawn from recesses 58 of female members 37 in the event that beam 12 is lifted upwardly. Through aperture 60 should be dimensioned sufficiently large to permit the full range of desired oscillatory motion for beam balance 12. The lower surface 64 of the head of screw 62 should be arranged to provide sufficient clearance with the upper surface of beam balance 12 to permit this oscillatory motion.

Pivotally secured to the rear wall 65 of beam balance 12 by means of a screw 67 is a tare adjustment member 70 having a central body portion 71 and an elongated tab portion 72. Tare adjustment may be effected by simply rotating member 70 either clockwise or counterclockwise until tab portion 72 provides a sufficient offsetting weight to zeroize pointer 16 with scale 17. To facilitate this adjustment, the outer surface of body portion 71 may be provided with a serrated or knurled surface. If desired member 70 may be mounted on the front wall of beam balance 12.

Another important feature of the invention is the provision for self-alignment of the point contact support elements 35. With reference to FIGS. 3 and 4, in a first embodiment of the invention this self-alignment is provided in the following manner. Mounting apertures 43 and coupling portions 40 are each dimensioned to provide a relatively snug press fit when coupled together; however, the diameter of mounting apertures 48 and 51 are made slightly larger than the outer diameter of coupling portions 41 of female element 37. Thus, when beam balance 12 is positioned on base 11 and rounded points 56 are received in recesses 58 in the corresponding female members 37, the female members 37 are free to move radially in the mounting apertures 48, 51 under the weight of the beam balance 12 until the rounded points 56 are centrally aligned in the recesses 58. Similarly, when balance pans 20, 21 are fitted onto beam balance 12, the corresponding alignment of female member 37 will take place.

FIG. 7 shows an alternate self-alignment arrangement in which the coupling portions 41 of the female members 37 are dimensioned with an outer diameter providing a snug fit with mounting apertures 48, 51; while the inner diameter of mounting apertures 43, 50 are slightly oversized to the diameter of coupling portion 40 of male members 36. FIG. 8 shows another alternate arrangement of the self alignment feature in which the coupling portions 40, 41 of both the male and female members 36, 37 have an outer diameter smaller than the inner diameter of the corresponding mounting apertures 43, 50, 48, 51.

In all the self-alignment arrangements disclosed, the relative clearance between the loosely fitting coupling portion and its corresponding mounting aperture should not be great. In the preferred embodiment, for example, the diameter of the loosely fitting coupling portion is 5/32 inch while the inner diameter of the corresponding mounting aperture is 6/32 inch, providing a 1/32 inch clearance therebetween. It should be noted that these dimensions are considered to be representative only.

FIG. 9 is a top plan view of the preferred form of an enlarged mounting aperture, such as apertures 48, 51 of FIGS. 3 and 4 or apertures 43, 50 of FIG. 7. As seen in this Fig., the aperture 48 is generally oval and has a maximum inner dimension 81 and a minimum inner dimension 82. Dimension 81 is preferably arranged substantially normal to the longitudinal axis of base 11 and balance beam 12 while dimension 82 is substantially parallel thereto. This arrangement ensures that the location of each of the several balance points does not vary in substantial manner in the longitudinal direction of the device, which would alter the effective length of the balance beam arms if permitted; while still affording a substantial amount of self-alignment of the device. In a specific embodiment actually constructed, dimension 81 is sized to provide a clearance of 0.125 inch with an associated support contact member having a stem portion with an outer diameter of 0.1875 inch; while dimension 82 provides a clearance of 0.0005 inch therewith. It should be noted that these dimensions are by way of example only.

While the male members 36 have all been illustrated as coupled to the relatively uppermost member, and the female members 37 have all been illustrated as being coupled to the lower element, the relative positions of these members may be inverted. For example, in the arrangement of FIG. 7 it would be preferable to mount female members 37 to the balance beam 12 in the base fulcrum region 13 and to portions 44, 45 of yokes 28; and to couple male members 36 to base 11 in the fulcrum region 13 and to beam balance 12 under the balance pans 20, 21 in order to facilitate assembly of the device.

As will now be apparent, beam balance weighing scales constructed in accordance with the teachings of the invention are rugged, compact, extremely simple to assemble and can be manufactured at extremely low cost. The majority of components can be fabricated using conventional plastic molding techniques, while the remaining components can be made from low-cost metal materials. The devices may be readily assembled by relatively unskilled persons, and can be subjected to rough handling without impairing the functional capabilities thereof.

While the above provides a full and complete disclosure of the preferred embodiments of the invention, various modifications, alternate constructions and equivalents may be employed without departing from the true spirit and scope of the invention. Therefore the above description and illustrations should not be construed as limiting the scope of the invention which is defined by the appended claims.

What is claimed is:

1. A beam balance weighing scale comprising:
   a base having a fulcrum region extending transversely thereof;
   a beam balance adapted to be supported on said base in said fulcrum region for oscillatory motion thereon;
   first means for providing point contact support for said beam balance on said base, said first point contact support means including first and second pairs of mating members, each said pair being alternately spaced along said fulcrum region, each said pair comprising a male support member having a centrally arranged longitudinally extending portion tapering inwardly toward one end thereof and terminating in a rounded point having a first radius of curvature, and a coupling portion extending in a generally opposite direction from said one end; and a female support member having a coupling portion extending in a first direction and a body portion with a centrally arranged recess facing in a direction generally opposite from said first direction for receiving said rounded point, said recess having a radius of curvature greater than the radius of curvature of said rounded point;
   said base and said balance beam each being provided with mounting apertures for receiving said coupling portions of said support members, a coupling portion of one of said male and female support members being received in said base mounting aperture and the coupling portion of the remaining one of said male and female support members being received in said balance beam mounting aperture; and
   means for providing automatic alignment for said first point contact support means, said automatic alignment means being provided by a loose fit between one of said coupling portions of each of said pair and the corresponding mounting aperture.

2. The combination of claim 1 wherein said male and female support members are coupled to said base and said beam, respectively.

3. The combination of claim 1 wherein said male and female support members are coupled to said beam and said base, respectively.

4. The combination of claim 1 wherein said male and female support members of said first pair are coupled to said base and said beam, respectively; and said male and female support members of said second pair are coupled to said beam and said base, respectively.

5. The combination of claim 1 wherein said beam has a pair of transversely outer fulcrum regions each located outboard of said base fulcrum region on opposite sides thereof, and further including a pair of balance pan means each adapted to be supported on said beam in a different one of said outer fulcrum regions for oscillatory motion thereon; and
   second means for providing point contact support for said balance pan means on said beam.

6. The combination of claim 5 wherein said second point contact support means comprises first and second pairs of mating members for each of said pair of balance pans, each said pair being laterally spaced along the corresponding one of said outer fulcrum regions, each said pair comprising a male support member having a centrally arranged longitudinally extending portion tapering inwardly toward one end thereof and terminating in a rounded point having a first radius of curvature, and a female support member having a centrally arranged recess for receiving said rounded point, said recess having a radius of curvature greater than the radius of curvature of said rounded point, one of said support members of each pair being coupled to said beam, the other one of said support members of each pair being coupled to said balance pan means.

7. The combination of claim 6 wherein said male and female support members of each pair are coupled to said balance pan means and said beam, respectively.

8. The combination of claim 6 wherein said male and female support members of each pair are coupled to said beam and said balance pan means, respectively.

9. The combination of claim 6 wherein said male and female support members of said first pair are coupled to said balance pan means and said beam, respectively; and said male and female support members of said second pair are coupled to said beam and said balance pan means, respectively.

10. The combination of claim 1 wherein said corresponding mounting aperture has an oval contour in the plane normal to the axis thereof, said oval contour having a maximum dimension in a direction substantially normal to the longitudinal axis of said beam balance and a minimum dimension in a direction substantially parallel to the longitudinal axis of said beam balance.

11. The combination of claim 1 wherein said loose fit is provided between the coupling portion of said male member and its corresponding aperture.

12. The combination of claim 1 wherein said loose fit is provided between the coupling portion of said female member and its corresponding aperture.

13. The combination of claim 1 further including second means for providing automatic alignment for said second point contact support means, said second alignment means being provided by a loose fit between one of said coupling portions of each of said pair of mating members of said second point contact support means and the corresponding mounting aperture.

14. The combination of claim 13 wherein said corresponding mounting aperture of one of said coupling portions of each of said pair of mating members of said second point contact support means has an oval contour in the plane normal to the axis thereof, said oval contour having a maximum dimension in a direction substantially normal to the longitudinal axis of said beam balance and a minimum dimension in a direction substantially parallel to the longitudinal axis of said beam balance.

15. The combination of claim 13 wherein said loose fit is provided between the coupling portion of each male member of said pair of mating members of said second point contact support means and its corresponding aperture.

16. The combination of claim 13 wherein said loose fit is provided between the coupling portion of each female member of said pair of mating members of said second point contact support means and its corresponding aperture.

17. A beam balance weighing scale comprising:
a base having a fulcrum region extending transversely thereof;
a beam balance adapted to be supported on said base in said fulcrum region for oscillatory motion thereon, said beam having a pair of transversely extending outer fulcrum regions each located outboard of said base fulcrum region on opposite sides thereof;
first means for providing point contact support for said beam balance on said base;
a pair of balance pan means each adapted to be supported on said beam in a different one of said outer fulcrum regions for oscillatory motion thereon; and
second means for providing point contact support for said balance pan means on said beam, said second point contact support means including first and second pairs of mating members for each of said pair of balance pans, each said pair being laterally spaced along the corresponding one of said outer fulcrum regions, each said pair comprising a male support member having a centrally arranged longitudinally extending portion tapering inwardly toward one end thereof and terminating in a rounded point having a first radius of curvature, and a female support member having a centrally arranged recess for receiving said rounded point, said recess having a radius of curvature greater than the radius of curvature of said rounded point, one of said support members of each pair being coupled to said beam, the other of said support members of each pair being coupled to said balance pan means; and means for providing automatic alignment for said second point contact support means, said second alignment means being provided by a loose fit between one of said coupling portions of each of said pair of mating members of said second point contact support means and the corresponding mounting aperture.

18. The combination of claim 17 wherein said corresponding mounting aperture has an oval contour in the plane normal to the axis thereof, said oval contour having a maximum dimension in a direction substantially normal to the longitudinal axis of said beam balance and a minimum dimension in a direction substantially parallel to the longitudinal axis of said beam balance.

19. The combination of claim 17 wherein said loose fit is provided between the coupling portion of said male member and its corresponding aperture.

20. The combination of claim 17 wherein said loose fit is provided between the coupling portion of said female member and its corresponding aperture.

21. The combination of claim 17 wherein said male and female support members of each pair are coupled to said balance pan means and said beam, respectively.

22. The combination of claim 17 wherein said male and female support members of each pair are coupled to said beam and said balance pan means, respectively.

23. The combination of claim 17 wherein said male and female support members of said first pair are coupled to said balance pan means and said beam, respectively; and said male and female support members of said second pair are coupled to said beam and said balance pan means, respectively.

* * * * *